R. COWAN.
UNIVERSAL WELDING CLAMP.
APPLICATION FILED DEC. 19, 1919.
1,386,318.
Patented Aug. 2, 1921.
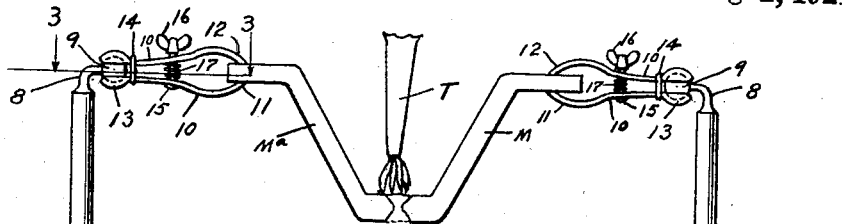
FIG. 1
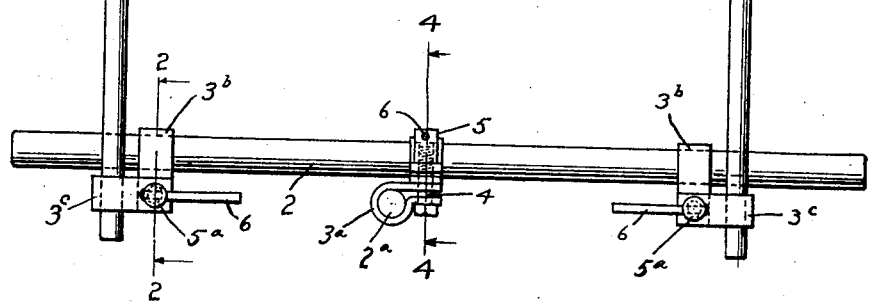
FIG. 2    FIG. 3
FIG. 4    FIG. 5
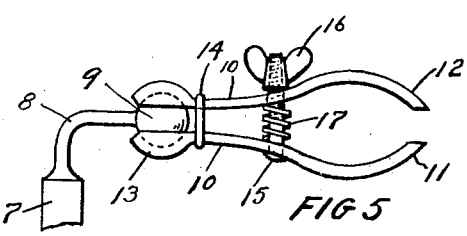
INVENTOR
RICHARD COWAN
BY
HIS ATTORNEYS.

UNITED STATES PATENT OFFICE.

RICHARD COWAN, OF CLIMAX, MINNESOTA.

UNIVERSAL WELDING-CLAMP.

1,386,318.  Specification of Letters Patent.  Patented Aug. 2, 1921.

Application filed December 19, 1919. Serial No. 346,070.

*To all whom it may concern:*

Be it known that I, RICHARD COWAN, a citizen of the United States, resident of Climax, county of Polk, State of Minnesota, have invented certain new and useful Improvements in Universal Welding-Clamps, of which the following is a specification.

In the operation of welding with an acetylene flame, it is necessary to support or block up the parts to be welded so that the broken edges will fit together squarely and evenly when the parts are united. Considerable time and labor is often required in blocking up the pieces to be welded or supporting them in the desired welding position, and the object of my invention is to provide a clamp so constructed that the two pieces to be united can be held in the exact welding position without danger of slippage and allowing the operator of the torch to have free use of both hands during the welding operation.

A further object is to provide a supporting clamp which will allow the parts that are to be united to be tilted or turned to any desired angle or position for convenience in welding.

The invention consists generally in various constructions and combinations, all as hereinafter described and particularly pointed out in the claims.

In the accompanying drawings forming part of this specification,

Figure 1 is a front view of a welding clamp embodying my invention,

Fig. 2 is a sectional view on the line 2—2 of Fig. 1,

Fig. 3 is a sectional view on the line 3—3 of Fig. 1,

Fig. 4 is a sectional view on the line 4—4 of Fig. 1,

Fig. 5 is a detail view of one of the clamping jaws in its open position.

In the drawing, 2 represents a rod or other support and 3 is a clamp encircling this rod and having holes in its ends to receive a bolt 4 that is provided with an interiorly threaded nut 5 for tightening the bolt on the clamp and drawing the metal portion of the clamp snugly against the surface of the rod 2. The nut 5 has a socket to receive a pin or nail 6 by means of which the nut may be revolved and the bolt tightened. A similar clamp 3ª is provided, having ends through which the bolt 4 passes, the clamp encircling a stud or suitable support 2ª on which the clamp 3ª is slidable horizontally and may also rotate to allow adjustment of the clamp 3 in different positions with respect to the stud 2ª. This manner of supporting the clamp 3ª permits the operator to tilt the entire clamping device to any convenient position for welding.

The rod 2 is provided with clamps 3ᵇ mounted on each end thereof and similar clamps 3ᶜ through the medium of bolts 4ª and nuts 5ª corresponding substantially to those described with reference to Fig. 4. The clamps 3ᶜ have vertical sockets to receive upright rods 7 which have inwardly turned goose necks 8 terminating in balls 9. Clamps 10 having gripping jaws 11 and 12 are provided and one end of each jaw has a socket 13 formed therein to receive the ball 9 and form a ball and socket bearing for the jaw, the ends of the jaws having the socket being held in place by a link 14. A threaded pin 15 is mounted in one jaw and passes through an opening in the other jaw and is provided with a wing nut 16 by means of which the gripping ends of the jaws 11 and 12 may be forced toward each other to clamp the article between them. A spring 17 normally holds the jaws 11 and 12 in their separated position.

In Fig. 1 I have shown two pieces of metal M and Mª supported at one end in the clamping jaws with the nozzle of the welding torch T interposed in position to apply the welding flame to the break in the metal. These breaks are irregular and it is a difficult operation to block up the pieces of metal so that the broken edges will fit snugly and evenly together and for the operator to apply the welding flame with the use of both hands. With my clamp this can easily be done. One piece of the part to be welded is inserted in one jaw and the other fits in the other jaw and then the jaws are rocked and turned on their ball bearings or the supporting rods are turned on their swivels until the two pieces of metal are in the same relative position as they were before the break occurred. Then the welding flame can be applied and the parts permanently united.

I claim as my invention:

1. A welding clamp comprising a rod and a supporting clamp for adjustment of said rod on a horizontal axis, clamps mounted on the end portions of said rod, upright standards having bearings in said clamps and mounted to rotate and slide vertically therein, the upper ends of said standards having inwardly turned goose necks formed thereon and jaws mounted at one end on said goose necks and extending inwardly in opposing relation for supporting the articles to be welded, and said jaws having universal adjustment on said goose necks to allow the accurate fitting together of the edges of the articles to be welded.

2. A welding clamp comprising a substantially straight rod and a supporting clamp for adjustment of said rod on a horizontal axis and rotation of said rod on a longitudinal axis, clamps mounted on the end portions of said rod, upright standards having bearings in said clamps to slide vertically therein, the upper ends of said standards having inwardly turned goose necks formed thereon and jaws mounted at one end on said goose necks and extending inwardly in opposing relation for supporting the articles to be welded, said jaws having universal adjustment on said goose necks to allow the accurate fitting together of the edges of the article to be welded.

In witness whereof, I have hereunto set my hand this 8th day of December 1919.

RICHARD COWAN.